(No Model.)
W. L. CASADAY.
WHEEL.
No. 489,458. Patented Jan. 10, 1893.
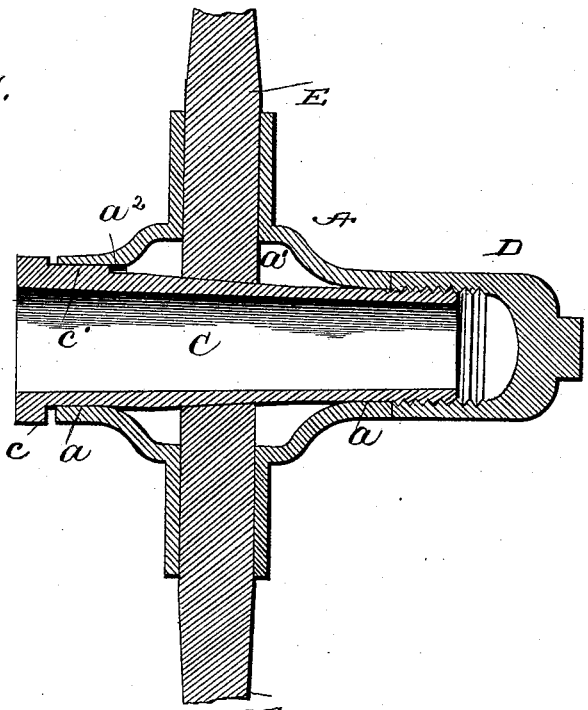
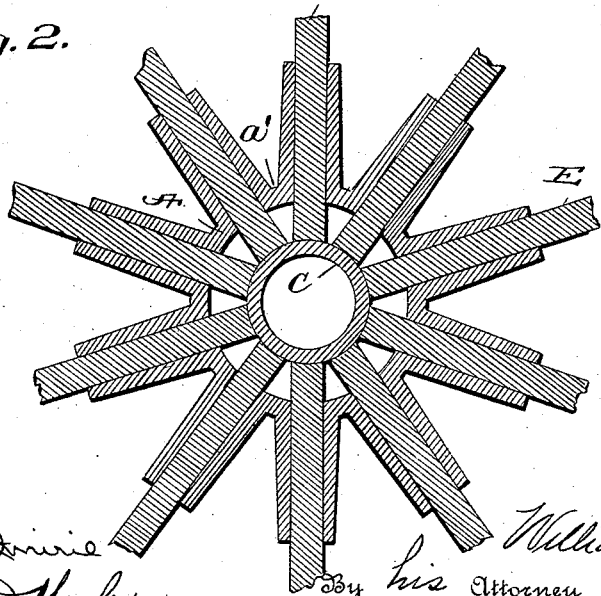

UNITED STATES PATENT OFFICE.

WILLIAM L. CASADAY, OF SOUTH BEND, INDIANA.

WHEEL.

SPECIFICATION forming part of Letters Patent No. 489,458, dated January 10, 1893.

Application filed March 23, 1892. Serial No. 426,124. (No model.)

*To all whom it may concern:*

Be it known that I, WILLIAM L. CASADAY, a citizen of the United States, residing at South Bend, in the county of St. Joseph and State of Indiana, have invented certain new and useful Improvements in Wheels; and I do hereby declare the following to be a full, clear, and exact description of the invention, such as will enable others skilled in the art to which it appertains to make and use the same.

My invention relates to improvements in metallic wheels more especially intended for agricultural machines and to the method of making the same, and has for its object to reduce the time, labor and cost in constructing the wheel and to provide a wheel that shall be strong, light and durable.

To these ends my invention consists in a wheel constructed in the manner hereinafter fully described and afterward definitely pointed out in the claims, due reference being had to the accompanying drawings forming a part of this specification, wherein—

Figure 1 is a section of my improved wheel taken longitudinally through the axis of the hub, said wheel being partially broken away. Fig. 2 is a section taken through the hub at right angles to that shown in Fig. 1.

Referring to the drawings the letter A indicates the hub which is constructed in one piece of metal and is provided with short radially projecting spoke-sleeves or sockets B, which are preferably made elliptical in cross section. Within the hub is fitted a tapered or wedge shaped box C provided at one end with a collar $c$ and screw-threaded at its other end for the reception of a cap-nut D which confines the box within the hub. The box C is provided with a lug or projection $c'$ which fits within a groove $a^2$ formed within the interior of the hub, which prevents the box from turning therein. The hub at its opposite interior ends is provided with smooth bores $a$, $a$, to fit the box C, and at its center is enlarged interiorly as at $a'$, to receive the ends of the spokes. The spokes E are also of metal and preferably elliptical in cross section to fit the spoke sleeves B and prevent their turning therein. The inner ends of the spokes bear against the tapered box C and their outer ends are riveted in the rim F, being provided near their outer ends with shoulders $e$ which bear against the inner periphery of wheel and firmly secure the ends of the spokes in the rim after they have been riveted. As thus constructed the wheel is extremely light and strong. In order to put the spokes under the desired tension and tighten the wheel the cap nut D is screwed up thus drawing the tapered box C within the hub which exerts a wedge like action against the inner ends of the spokes and forces them outward. The collar $c$ formed upon the inner end of the box C is adapted to bear against the inner end of the hub and limit the movement of the box within the hub, thus preventing all danger of the tapered box being drawn sufficiently within the hub to flatten the rim.

The method of constructing the wheel is as follows. The hub, spokes, box and rim are constructed of metal and in the manner above described. The inner ends of the spokes are first inserted within the spoke sleeves B, the central bore $a'$ being large enough to permit the spokes entering the hub far enough to slip the rim over the outer ends of the spokes. After the rim has been slipped over the spokes, and the outer ends of the spokes inserted in holes in the rim which are bored therein for their reception, a tapered mandrel is inserted in the hub, the inner ends of the spokes bearing against the same. The mandrel being forced in the hub the spokes are forced outward against the rim and their ends riveted therein by means of a suitable riveting machine.

It has been found impractical to make a quantity of rims and spokes cheaply and rapidly and have them of a uniform size and length, and in constructing the wheel I make the spokes slightly longer than is required and after the spokes have been riveted to the rim and the mandrel withdrawn their inner ends are cut off by a tool. Said tool is made to fit the smooth end portions $a$, $a$, of the hub, which thus centers the tool, and the ends of the spokes cut off uniformly to bear against the tapered box. The box is then inserted within the hub and the cap nut screwed on. Said box being tapered or substantially wedge shaped the required degree of tension can be given to the spokes by means of the cap nut.

When the hub is made of malleable metal it is preferable, by means of an upsetting machine, to upset the ends of the spoke sleeves about the spokes, thus preventing any looseness of the spokes within the sleeves.

By adopting this method of constructing the wheel it is not necessary that the parts should be made accurately, thus economizing time and labor, and when completed a very strong and rigid wheel is produced.

Having described my invention what I claim is:

1. The method herein described of making metallic wheels consisting in inserting the inner ends of the spokes within sockets formed in the hub, slipping the rim over the outer ends of the spokes forcing the spokes outward by a tapering mandrel inserted within the hub, withdrawing the mandrel and cutting off the inner ends of the spokes by means of a tool centered within the hub, and finally inserting a tapering box within the hub and adjusting the same therein to force the spokes outwardly, substantially as described.

2. In a wheel the combination with a hub having radial spoke-sleeves and an interior groove, a tapering box fitted within said hub and provided with a lug engaging the groove in the hub, a collar upon one end of the box and a cap-nut upon the other end, said collar and nut bearing against the ends of the hub, spokes fitted within said spoke sleeves and bearing against the tapered box, the spokes near their outer ends being provided with shoulders, as shown, and a rim fitted over the outer ends of the spokes, the ends of the spokes being riveted in said rim, substantially as described.

In testimony whereof I affix my signature in presence of two witnesses.

WILLIAM L. CASADAY.

Witnesses:
GEO. M. FEERRAR,
P. J. PIXLEY.